Sept. 28, 1965　　　　　　　　J. HOLUB　　　　　　　　3,208,257
DEVICE FOR SHAPING ROTATIONAL OR ANGULAR OBJECTS
Filed Aug. 21, 1963　　　　　　　　　　　　　　　　　3 Sheets-Sheet 1
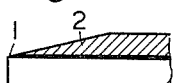
Fig. 2.
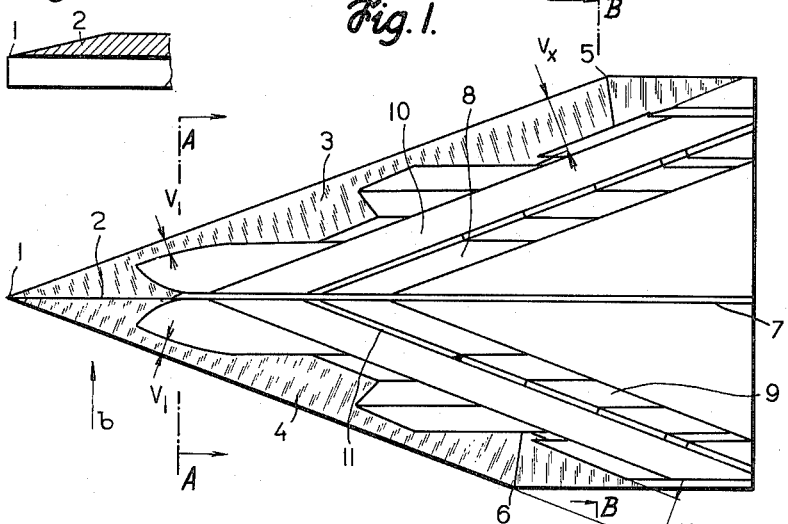
Fig. 1.
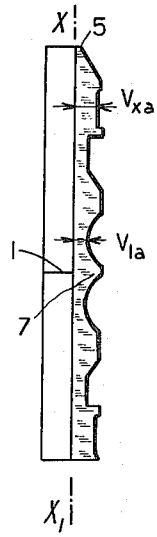
Fig. 3.
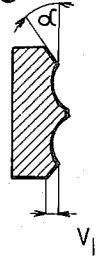
Fig. 4.
Fig. 5.
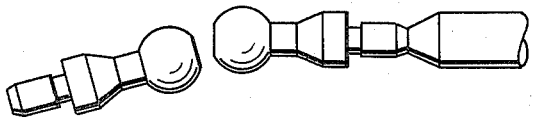
Fig. 6.
Fig. 7.
INVENTOR.
Jiří Holub
BY Richard Low
        Ag't Sept. 28, 1965  J. HOLUB  3,208,257
DEVICE FOR SHAPING ROTATIONAL OR ANGULAR OBJECTS
Filed Aug. 21, 1963  3 Sheets-Sheet 2
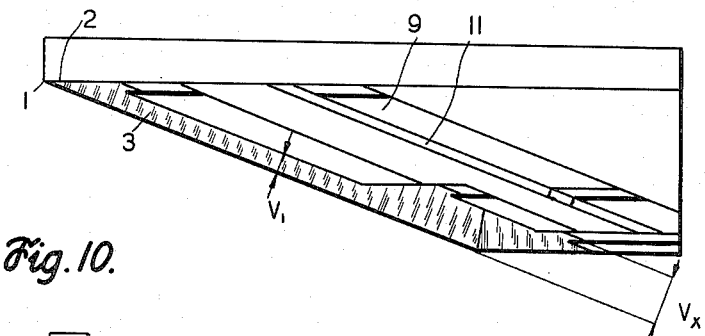
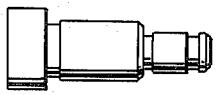
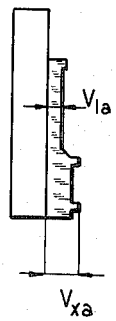
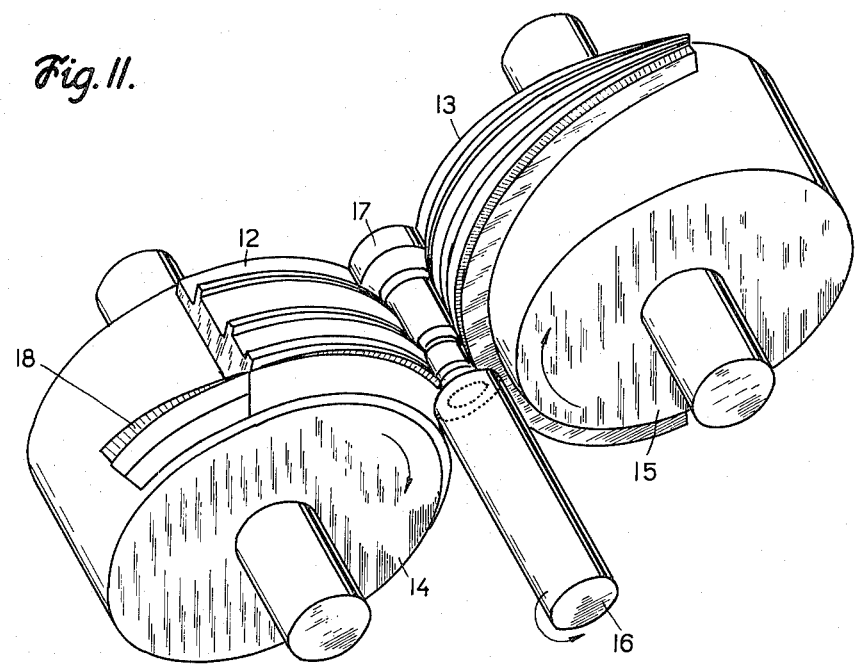
INVENTOR.
Jiří Holub
BY Sept. 28, 1965
J. HOLUB
3,208,257
DEVICE FOR SHAPING ROTATIONAL OR ANGULAR OBJECTS
Filed Aug. 21, 1963
3 Sheets-Sheet 3
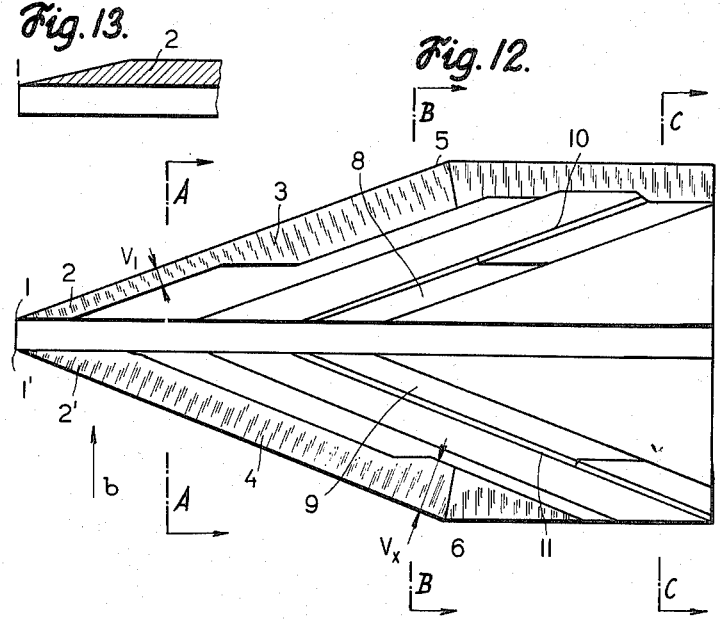
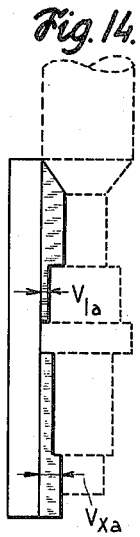
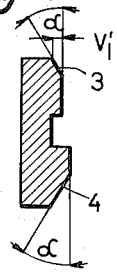
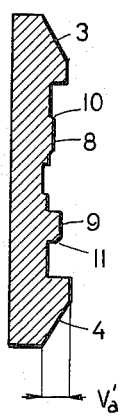
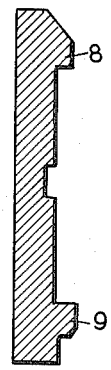
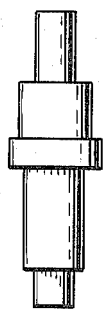
INVENTOR.
Jiří Holub
BY
Richard Ernst
agt

United States Patent Office 3,208,257
Patented Sept. 28, 1965

3,208,257
DEVICE FOR SHAPING ROTATIONAL OR ANGULAR OBJECTS
Jiří Holub, Prague, Czechoslovakia, assignor to Smeralovy Zavody, narodni podnik, Brno, Czechoslovakia
Filed Aug. 21, 1963, Ser. No. 303,545
Claims priority, application Czechoslovakia, Aug. 21, 1962, 4,867/62
3 Claims. (Cl. 72—108)

The invention relates to a device for shaping rotational or angular objects by means of transversal cuneiform or bevel-rolling between two oppositely moving surfaces of interchangeable tools having the shape of a triangle on a cylindrical or planar surface.

One of the main objects of this invention is to provide calibration surfaces on tools of the mentioned type.

The shaping of rotational or angular objects by means of transversal bevel-rolling between oppositely moving surfaces of cylinders with the same direction of rotation has also been used in various modifications to a limited extent, where the nature of production admits such method of shaping.

A common drawback of all hihterto known devices used for the above mentioned purpose resides in the fact that there are no inclined, helical or conical reduction surfaces. In some devices of the mentioned type such surfaces have been provided but except for the starting part their height over the entire length is the same. Such constant height of the reduction surface can create on the product only a cylindrical surface but it cannot create a surface shaped in different manners, for example it cannot provide for example transversal incisions or indentations, recesses, spherical or conical surfaces.

Hitherto known devices are also not concerned with the problem of reducing production tolerances of the product and they have no calibration surfaces.

The present invention eliminates the above mentioned drawbacks of the known state of art.

In accordance with one of the features of this invention the tools are not only provided with helical reduction surfaces, but also with calibration surfaces, and the said reduction surfaces as well as the calibration surfaces have in their transversal section a variable height which corresponds to the negative shape of the product, while in their longitudinal sections the heights of the tool are the same over their entire length.

In accordance with a further feature of the invention the reduction surfaces are roughened, for example by knurling or in another manner.

Another feature of the invention provides on the tools in parallel with the surface of the cylinders calibration surfaces of triangular shape with a helical working surface.

Still another feature of the invention provides on the end of the tools two knives or chisels for separating the products from the bar of material. The cutting parts of these chisels have the shape of a rising curve.

In the arrangement according to the invention one shaping tool with a variable height replaces substantially several shaping tools with a constant height of the reduction surface. The building length of the tools can be considerably reduced and thus it becomes possible to make with the same circumference of the cylinders a more complex and longer product than with previously known methods.

The calibration insert which is built-in in the inner space of the shaping tools allows finer production tolerances, and the product can reach more exact shapes.

Another advantage of the invention resides in the fact that the new device allows to roll details from a bar in a continuous manner like with an automatic lathe, and the completed product can be separated from the bar by means of chisels of a special shape.

The invention will be best understood from the following specification to be read in conjunction with the accompanying drawings in which:

FIG. 1 is a top view of a shaping tool (a segment in the expanded state);
FIG. 2 is a side view of the end of the segment in the direction of arrow $b$;
FIG. 3 is a view of the segment from the left side;
FIG. 4 is a section through the plane A—A;
FIG. 5 is a section through the plane B—B;
FIG. 6 shows two rolled products;
FIG. 7 is a product cut away from the bar;
FIG. 8 is a top view of the shaping segment with one reduction surface;
FIG. 9 shows the segment viewed from the left side (FIG. 8);
FIG. 10 is a product cut away from the bar;
FIG. 11 is an axionometric view of the entire device;
FIG. 12 is a top view of two lateral shaping segments placed together into the shape of a central segment;
FIG. 13 shows the end of the segment from the left lateral side;
FIG. 14 shows the same tool from the left side;
FIG. 15 is a section in the plane A—A;
FIG. 16 is a section in the plane B—B;
FIG. 17 is a section in the plane C—C; and
FIG. 18 shows a product produced by means of the device according to the invention.

Referring now more particularly to the various figures:
The shaping segment in FIG. 1 is provided with two helical reduction surfaces (which are inclined in the expanded state) 3, 4 which start from the lowest point 1. They join together in a back 2 which initiates the operation when the shaping of the material begins. The object of the helical reduction surfaces 3, 4 is to reduce the material from a larger diameter to a smaller one. The height of these reduction surfaces 3, 4 from the cylindrical surface $X-X_1$ (FIG. 3) which is parallel with the surface of the cylinders, is over the entire length of these surfaces from point 1 to points 5, 6 (FIG. 1) variable from a value $v_{1a}$ to $v_{xa}$ (FIG. 3). These variable heights appear in FIG. 1 as $v_1$, $v_2$. In the side elevation of FIG. 3 these variable heights are the negative contour of the product illustrated in FIG. 5. The helical reduction surfaces with a small height reduce a small quantity of material producing larger diameters. The reduction surfaces with a larger height reduce a large quantity of material thus producing diameters of smaller dimensions. The helical reduction surfaces 3, 4 must be knurled or roughened in another manner, for example by sand-blasting, in order to achieve sufficiently large friction in the rolling process which is particularly necessary to the case of a large reduction of the material. The calibration insert consists of two helical ledges 8, 9 which have also a triangular shape. This calibration insert is shaped over its entire length like the reduction surfaces 3, 4. On the front edge of the calibration ledges 8, 9 are provided small reduction surfaces 10, 11. The product is rerolled by the calibration insert and this yields more exact shape tolerances. The reduction surfaces 3, 4 are inclined on both sides under the same angle α. FIG. 4 represents a section at the place of the smallest height $v$, and FIG. 5 is a section at the place of the largest height $v$.

The central shaping segments (FIG. 1) are used with advantage when rolling a more complex product, for example two pieces at the same time (FIG. 6). In this case the shaping pressures acting in the longitudinal axis of the product are at balance which has a favorable effect over the entire period of rolling. The guiding ledge 7

(FIG. 3) extends over the entire length of the shaping segment through the center of the triangle and it serves to maintain the straight direction of the product during rolling. The rolled twin product (FIG. 6) is cut through at its center immediately after rolling has been completed whereby one rolled product is separated (FIG. 7) and the remaining second rolled product is cut away from the bar of material. This cutting process takes place immediately after the product has been rolled.

FIG. 8 illustrates a single-sided shaping segment of triangular shape with one helical reduction surface 3 which starts again from the lowest point 1 and forms a starting back 2. The inclined reduction surface has again a variable height from $v_1$ to $v_x$ (FIG. 8). Viewed from the side (FIG. 9) the shaping surface with a height $v_{1a}$ to $v_{xa}$ represents the negative contour of the product. The shaping segments with one reduction surface is used in case where this appears advantageous with regard to the shape of the product.

FIG. 11 illustrates a practical application of the shaping segments 12, 13 attached on two surfaces moving oppositely and rotating in the same sense of the cylinders 14, 15.

The sense of movement of the cylinders is indicated by arrows. The bar or rod 16 is being shaped into a product 17 by a pair of segments 12, 13. During the shaping operation the bar 16 rotates in the direction of the arrow. The completed product is cut away from the bar by two chisels 18. In FIG. 11 the second chisel is not illustrated because it is on the opposite side of the cylinder 15. The chisels 18 are made from thin sheet metal of a refractory material. The active part of the chisel has the shape of a curve with a non-uniformly rising tendency. It rises first slowly and then faster. This is due to the fact that the material which is being separated has at the beginning of the separation process a large diameter and therefore a large circumference. The chisels do not cut the material but they penetrate into it. The material escapes to the sides and no cuttings are therefore created in this operation. The curves of the chisel must be given an exponential shape to enable the chisels to penetrate smoothly and evenly into the material with each revolution, and at the same rate with large and small diameters.

FIGS. 12 to 17 illustrate the use of two double-sided shaping segments of triangular shape (left and right) composed in a similar shape as the central shaping segment (FIG. 1). Here there are two helical reduction surfaces 3, 4 which start from two separate lowest points 1, 1' and form backs 2, 2' which start the operation in shaping the bar. The space between the backs 2, 2' does not take part in the shaping. A collar is therefore produced on the product, the diameter of this collar being the same as the diameter of the bar which is being rolled. The height $v_1$ to $v_x$ of the helical reduction surfaces 3, 4 and the calibration ledges 8, 9 from the cylindrical surface $x$ to $x_1$ (FIG. 14) is variable and this corresponds to the negative shape of the product in FIG. 18. The other functions of the reduction and calibration surfaces are the same as in the case of the central shaping segments (FIGS. 1 to 3). FIGS. 15, 16 and 17 are transversal sections through the shaping segments (FIG. 12). It can be seen that the reduction surfaces 3, 4 and calibration ledges 8, 9 rise above the surfaces which are between the shaping surfaces and calibration ledges, and the triangular surfaces are then behind the calibration ledges. Here also can be seen small helical reduction surfaces 10, 11 on the calibration ledges 8, 9. FIG. 18 shows a product produced by the shaping segments (FIG. 12).

I claim:

1. Rolling apparatus for shaping rotational objects by angular rolling between two oppositely moving surfaces of exchangeable tools of triangular shape, fixed on a cylindrical surface with angularly disposed reducing surfaces which create a gradually increasing starting ridge, having on the tools, in addition to said reducing surfaces, wedge-shaped calibrating surfaces which are provided with narrow spreading surfaces, said spreading surfaces being arranged between said reducing surfaces and being constructed to displace the excess of material from the center to both ends of the object to be rolled during one revolution of said working tools.

2. The apparatus according to claim 1, wherein said angularly disposed surfaces are roughened by knurling.

3. The apparatus according to claim 1, wherein said tools have attached thereto on the ends thereof two chisels for separating the objects from a bar of material, said chisels having cutting parts in shape of a curve with an increasing rise.

References Cited by the Examiner

UNITED STATES PATENTS

| | | | |
|---|---|---|---|
| 137,009 | 3/73 | Livingstone | 80—53 |
| 350,906 | 10/86 | Wyman | 80—53 |
| 375,783 | 1/88 | Tebbets | 80—53 |
| 1,987,234 | 1/35 | Hill | 80—53 |
| 2,689,493 | 9/54 | Bedker | 80—53 |

CHARLES W. LANHAM, *Primary Examiner.*